United States Patent [19]

Yale

[11] Patent Number: 4,925,594

[45] Date of Patent: * May 15, 1990

[54] HYDROLYSIS RESISTANCE OF RARE EARTH OXYSULFIDE PHOSPHORS PRODUCED BY THE ADDITION OF ZINC IN SYNTHESIS

[75] Inventor: Ramon L. Yale, Towanda, Pa.

[73] Assignee: GTE Products Corporation, Stamford, Conn.

[*] Notice: The portion of the term of this patent subsequent to Dec. 10, 2006 has been disclaimed.

[21] Appl. No.: 341,887

[22] Filed: Apr. 24, 1989

[51] Int. Cl.$^5$ ............................................... C09K 11/84
[52] U.S. Cl. ........................ 252/301.6 S; 252/301.4 S
[58] Field of Search .................... 252/301.4 S, 301.6 S

[56] References Cited

U.S. PATENT DOCUMENTS

| | | | |
|---|---|---|---|
| 3,563,909 | 2/1971 | Schuil et al. | 252/301.4 S |
| 3,705,858 | 12/1972 | Luckey et al. | 252/301.4 S |
| 3,883,747 | 5/1975 | Murashige et al. | 252/301.4 S |
| 4,113,648 | 9/1978 | Ferri et al. | 252/301.4 S |
| 4,507,560 | 3/1985 | Mathers et al. | 252/301.4 S |
| 4,690,832 | 9/1987 | Yale | 252/301.6 S |
| 4,888,129 | 12/1989 | Yale | 252/301.6 S |

FOREIGN PATENT DOCUMENTS 60-15485 1/1985 Japan .................. 252/301.6 S

*Primary Examiner*—Jack Cooper
*Attorney, Agent, or Firm*—Robert E. Walter; L. Rita Quatrini

[57] ABSTRACT

A process is disclosed for producing a hydrolysis resistant rare-earth oxysulfide phosphor which comprises forming a uniform mixture of one or more rare earth oxides, sulfur, alkali carbonate, alkali phosphate, terbium oxide, and a zinc compound wherein the zinc compound is provided in an amount sufficient to result in a zinc concentration of from about 0.05% to about 1.0% by weight, heating the mixture in an air atmosphere in a covered vessel at a temperature of from about 900° C. to about 1400° C. for a sufficient time to form a terbium-activated rare-earth oxysulfide, washing the terbium-activated rare-earth oxysulfide with deionized water to remove essentially all of any water soluble impurities which are present, annealing the washed terbium-activated rare-earth oxysulfide in air at a temperature of from about 525° C. to about 590° C. for about 1 hour to about 3 hours to enhance the brightness of the phosphor. The phosphor has a resistance to hydrolysis that is at least about 35% greater than phosphor produced without the zinc addition.

2 Claims, No Drawings

HYDROLYSIS RESISTANCE OF RARE EARTH OXYSULFIDE PHOSPHORS PRODUCED BY THE ADDITION OF ZINC IN SYNTHESIS

CROSS REFERENCE TO RELATED APPLICATION

This application is related to applications Ser. No. 341,886, now U.S. Pat. No. 4,888,129, entitled "Process For Producing A Terbium-Activated Gadolinium Oxysulfide X-ray Phosphor Having A Specific Green/Blue Emission Ratio By The Addition Of Zinc", and Ser. No. 342,159 entitled "Process For Providing Hydrolysis Resistant Phosphors", both filed concurrently herewith and both assigned to the same assignee as the present application.

BACKGROUND OF THE INVENTION

This invention relates to a process for imparting hydrolysis resistance to rare-earth oxysulfide phosphors by adding zinc to the initial reactant mixture and firing this mixture to form the phosphor.

Rare-earth oxysulfide phosphors have become successful x-ray intensifier phosphors. In this application the phosphor is applied to an organic film or substrate which forms the basis of an intensifier screen. The screen is mounted in a cassette where in operation the phosphor thereon is exposed to x rays. The phosphor converts the x rays into visible or near-visible radiation to which a photosensitive film is exposed resulting in an image being produced on the film.

One of the problems that has developed in the above application is that if the phosphor comes in contact with water, hydrolytic reaction can occur and hydrogen sulfide is released. Additionally, if water is inadvertently dropped on an intensifier screen in an x-ray cassette and a film is placed in the cassette, a reaction between hydrogen sulfide and the silver halide in the film emulsion occurs. This reaction can cause a discoloration on the intensifying screen which in turn can degrade radiographic image quality.

SUMMARY OF THE INVENTION

In accordance with one aspect of the invention, there is provided a process for producing a hydrolysis resistant rareearth oxysulfide phosphor which comprises forming a uniform mixture of one or more rare earth oxides, sulfur, alkali carbonate, alkali phosphate, terbium oxide, and a zinc compound wherein the zinc compound is provided in an amount sufficient to result in a zinc concentration of from about 0.05% to about 1.0% by weight, heating the mixture in an air atmosphere in a covered vessel at a temperature of from about 900° C. to about 1400° C. for a sufficient time to form a terbium-activated rare-earth oxysulfide, washing the terbium-activated rare-earth oxysulfide with deionized water to remove essentially all of any water soluble impurities which are present, annealing the washed terbium-activated rare-earth oxysulfide in air at a temperature of from about 525° C. to about 590° C. for about 1 hour to about 3 hours to enhance the brightness of the phosphor. The phosphor has a resistance to hydrolysis that is at least about 35% greater than phosphors produced without the zinc addition.

DETAILED DESCRIPTION OF THE INVENTION

For a better understanding of the present invention, together with other and further objects, advantages, and capabilities thereof, reference is made to the following disclosure and appended claims in connection with the above description of some of the aspects of the invention.

By the process of this invention, a rare-earth oxysulfide phosphor is made resistant to hydrolysis by addition of a zinc compound to the initial reaction mixture from which the phosphor is formed.

The phosphors of this invention are gadolinium oxysulfide, yttrium oxysulfide, lanthanum oxysulfide, and gadolinium-yttriumn oxysulfide. The phosphors contain from about 0.001 moles to about 0.10 moles of terbium per mole of host as an activator.

The phosphor is made by first forming a relatively uniform mixture of the reactants of which the terbium-activated rare-earth oxysulfide phosphor is to be formed. They are one or more rare-earth oxides, sulfur, alkali carbonate, alkali phosphate, and terbium oxide. The rare-earth oxide can be gadolinium oxide, yttrium oxide, lanthanum oxide or a mixture of gadolinium oxide and yttrium oxide depending on the particular phosphor that is to be made. The alkali carbonate can be sodium carbonate, potassium carbonate or a combination of these. It is especially preferred to use sodium carbonate. The alkali phosphate can be sodium phosphates, potassium phosphate, or a combination of these. It is especially preferred to use sodium monohydrogen phosphate. The terbium concentration is typically from about 0.25% to about 0.9% by weight in the mixture when gadolinium oxide is the rare earth oxide. A zinc compound is added also. The amount of zinc that is added is sufficient to result in from about 0.05% to about 1.0% by weight in the mixture. This amount of zinc results in a hydrolysis resistance that is at least about 35% greater than in phosphors produced without using zinc.

A number of zinc compounds can be used to provide the zinc. Some compounds especially suited to the practice of the present invention are zinc oxide, zinc chloride, zinc sulfate, zinc fluoride, zinc sulfide, and combinations of these.

The resulting mixture is heated in an air atmosphere which is in a covered vessel which is typically made of aluminum oxide, at a temperature of from about 900° C. to about 1400° C. and preferably from about 900° C. to about 1300° C. for a sufficient time preferably for about about 2 hours to about 8 hours. The above temperatures and times allow for flexibility that has to be maintained in order to be able to adjust for proper particle size, as additions of zinc can effect particle size. For example, zinc concentration generally affects particle growth at higher temperatures.

The resulting heated material which is terbium-activated rare-earth oxysulfide is then washed with deionized water to remove essentially all of any water soluble impurities such as polysulfides which are present normally as by products of the reaction. This is done by slurry techniques which are familiar to those skilled in the art.

Typically, the resulting washed terbium-activated rare-earth oxysulfide is then deagglomerated. Deagglomeration can be done by wet milling. This is done typically by milling about 400 g of material with about 300 ml of deionized water per liter of the milling container with about 1 kilogram of milling media such as ⅜" high density alumina balls. The milling is done typically in a one liter polypropylene container of about 3½" in diameter for about 30 minutes at about 80 rpm. Deagglomeration can be done also by dry milling the phosphor after it has been washed and dried. The same weights and volumes as stated above can be used with the exception of the deionized water.

The phosphor can be washed with acetic acid such as a 0.2 molar acetic acid solution and thereafter washed with deionized water to a conductivity of less than about 10 micromhos.

If the resulting washed phosphor is dried, the drying is done preferably at a temperature of from about 100° C. to about 150° C. for about 2 to about 4 hours.

The resulting phosphor is then annealed in air which is usually ambient air at a temperature of from about 525° C. to about 500° C. and preferably from about 550° C. to about 575° C. for a sufficient time preferably from about 1 hour to about 3 hours to enhance the brightness in the final product phosphor.

The phosphor can be classified if desired to obtain the desired particle size.

The following table shows the relative hydrolysis resistance of various phosphors in which various zinc compounds were introduced into the initial reaction mixture in an amount equal to about 6500 weight ppm.

TABLE

| # | Description | Relative Hydrolysis Resistance |
|---|---|---|
| 1 | Control (no zinc) | 0 |
| 2 | Zinc oxide | 7 |
| 3 | Zinc chloride | 3.7 |
| 4 | Zinc sulfate | 5.5 |
| 5 | Zinc fluoride | 6 |
| 6 | Zinc sulfide | 5.5 |

To more fully illustrate this invention, the following nonlimiting example is presented.

EXAMPLE

The following dry blend of materials is made up:

| | | |
|---|---|---|
| $Gd_2O_3$ | 179.4 g | |
| $Tb_4O_7$ | 1 g | |
| S | 104.00 g | |
| $Na_2CO_3$ | 106.00 g | |
| $Na_2HPO_4$ | 14.20 g | |
| ZnO | 1.532 g | (to provide about 6500 weight ppm of Zn) |

The mixture is thoroughly blended and heat treated in a covered crucible in air for about 5 hours at about 1200° C. The resultant sulfurous cake is soaked in hot deionized water, slurried and allowed to settle, followed by decantation. This is followed by sufficient deionized water washes to completely remove all soluble materials. The final slurry is filtered and the cake is dried. The material is wet milled for the purpose of deagglomeration. This is done in a 500 cc Nalgene bottle with about 250 cc of ⅜ inch alumina balls and about 150 ml of cold deionized water for about 30 minutes at about 80 rpm. A 0.2 molar acetic acid wash is given at a phosphor to liquid concentration of about 120 grams per liter for about 20 minutes at about 70° C. with thorough agitation. After settling and decantation, deionized water washes are given to achieve a conductivity of less than about 10 micromhos. The slurry is then filtered and dried for about 2 hours at greater than about 100° C. The dried powder is then placed in silica trays at about 1.3 cm bed depth and heat treated for about 2 hours at about 580° C. in air. After being cooled, the material is sieved through a 400 mesh stainless steel sieve.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for producing a hydrolysis-resistant terbiumactivated rare-earth oxysulfide x-ray phosphor, said process comprising:
    (a) forming a uniform mixture of one or more rare-earth oxides, sulfur, alkali carbonate, alkali phosphate, terbium oxide, and a zinc compound wherein said zinc compound is provided in an amount sufficient to result in a zinc concentration of from about 0.05% to about 1.0% by weight, in the mixture and terbium is present in an amount of from about 0.001 moles to about 0.10 moles per mole of rare earth oxysulfide
    (b) heating said mixture in an air atmosphere in a covered vessel at a temperature of from about 900° C. to about 1400° C. for a sufficient time to form a terbium-activated rare-earth oxysulfide;
    (c) washing said terbium-activated rare-earth oxysulfide with deionized water to remove essentially all of any water soluble impurities which are present; and
    (d) annealing the resulting washed terbium-activated rare-earth oxysulfide in air at a temperature of from about 525° C. to about 590° C. for about 1 hour to about 3 hours to enhance the brightness of said phosphor, said phosphor having a resistance to hydrolysis that is at least about 35% greater than phosphor produced as above absent the zinc addition.

2. A process of claim 1 wherein said rare earth oxide is selected from the group consisting of gadolinium oxide, yttrium oxide, lanthanum oxide, and a mixture of gadolinium oxide and yttrium oxide.

* * * * *